(12) United States Patent
Sipes, Jr. et al.

(10) Patent No.: US 11,579,366 B2
(45) Date of Patent: Feb. 14, 2023

(54) PHOTONIC ANTENNA ARRAY WITH TAPERED FIBER ENDS

(71) Applicant: Optical Engines, Inc., Colorado Springs, CO (US)

(72) Inventors: Donald Lee Sipes, Jr., Colorado Springs, CO (US); Jason D. Tafoya, Colorado Springs, CO (US); Daniel Scott Schulz, Colorado Springs, CO (US)

(73) Assignee: OPTICAL ENGINES, INC., Colorado Springs, CO (US)

( * ) Notice: Subject to any disclaimer, the term of this patent is extended or adjusted under 35 U.S.C. 154(b) by 445 days.

(21) Appl. No.: 16/705,912

(22) Filed: Dec. 6, 2019

(65) Prior Publication Data
US 2020/0183086 A1 Jun. 11, 2020

Related U.S. Application Data

(60) Provisional application No. 62/776,299, filed on Dec. 6, 2018.

(51) Int. Cl.
*G02B 6/26* (2006.01)
*H04B 10/112* (2013.01)
(Continued)

(52) U.S. Cl.
CPC .......... *G02B 6/262* (2013.01); *G02B 6/0046* (2013.01); *H01Q 21/068* (2013.01);
(Continued)

(58) Field of Classification Search
CPC .. H04B 10/112; H04B 10/118; H04B 10/501; G02B 6/262; G02B 6/0046
See application file for complete search history.

(56) References Cited

U.S. PATENT DOCUMENTS

| | | | | |
|---|---|---|---|---|
| 3,459,466 A | * | 8/1969 | Giordmaine | ............... G02F 1/00 359/315 |
| 5,013,151 A | * | 5/1991 | Hughes | ................... G01S 17/66 356/139.08 |

(Continued)

OTHER PUBLICATIONS

Heck: "Highly integrated optical phased arrays: photonic integrated circuits for optical beam shaping and beam steering", Nanophotonics 2017, 6(1): pp. 93-107 (Year: 2017).*

(Continued)

*Primary Examiner* — Li Liu
(74) *Attorney, Agent, or Firm* — Leydig, Voit & Mayer, Ltd.

(57) ABSTRACT

A photonic antenna array includes: a plurality of tapered fiber ends; and a support plate. Each tapered fiber end of the plurality of tapered fiber ends corresponds to a respective fiber of a plurality of fibers. A portion of each of the plurality of fibers is run through the support plate. A fiber core diameter at a tapered end point of a respective tapered fiber end of the plurality of tapered fiber ends has a first diameter. A fiber core diameter at a non-tapered portion of the respective fiber corresponding to the respective tapered fiber end has a second diameter. The first diameter is smaller than the second diameter. The respective tapered fiber end is configured to provide a mode field diameter larger than a diameter of the non-tapered portion of the respective fiber corresponding to the respective tapered fiber end.

13 Claims, 14 Drawing Sheets

(51) Int. Cl.
 *F21V 8/00* (2006.01)
 *H01Q 21/06* (2006.01)
 *H04B 10/118* (2013.01)
 *H04B 10/50* (2013.01)

(52) U.S. Cl.
 CPC ......... *H04B 10/112* (2013.01); *H04B 10/118* (2013.01); *H04B 10/501* (2013.01)

(56) References Cited

U.S. PATENT DOCUMENTS

| | | | | |
|---|---|---|---|---|
| 5,543,805 | A * | 8/1996 | Thaniyavarn | H01Q 3/2676 342/368 |
| 6,337,659 | B1 * | 1/2002 | Kim | H01Q 3/30 342/373 |
| 6,788,864 | B2 * | 9/2004 | Ahmad | G02B 6/02304 385/123 |
| 7,729,572 | B1 * | 6/2010 | Pepper | H01Q 3/2682 385/27 |
| 8,559,823 | B2 * | 10/2013 | Izadpanah | H01Q 3/2676 398/115 |
| 9,413,448 | B2 * | 8/2016 | Ashrafi | H04B 10/25752 |
| 10,564,360 | B2 * | 2/2020 | Kopp | G02B 6/26 |
| 11,256,080 | B2 * | 2/2022 | Swanson | G02B 6/34 |
| 2002/0126479 | A1 * | 9/2002 | Zhai | G02B 5/32 345/32 |
| 2016/0231506 | A1 * | 8/2016 | Jiang | G02B 6/2938 |
| 2017/0041068 | A1 * | 2/2017 | Murakowski | H04B 7/08 |
| 2017/0299900 | A1 * | 10/2017 | Montoya | G02F 1/0121 |
| 2018/0067273 | A1 * | 3/2018 | Geng | G02B 6/305 |
| 2020/0379314 | A1 * | 12/2020 | Hashiya | G02F 1/015 |

OTHER PUBLICATIONS

Harun, S.W., et al. "Theoretical Analysis and Fabrication of Tapered Fibers" *Optik* 124: 538-543, (Mar. 2013).

Hoffman, J.E., et al. "Ultra High Transmission of Optical Nanofibers" *AIP Advances* 4, 067124-067124-16, (Jun. 2014).

Nagai, R., et al. "Ultra-low-loss Tapered Optical Fibers with Minimal Lengths," *Optics Express* 22(23), doi: 10.1364/ OE.22.028127, (Nov. 2014).

Ward, J.M., et al. "Contributed Review: Optical Micro- and Nanofiber Pulling Rig", *Review of Scientific Instruments* 85, 111501, doi 10.1063/1.4901098, (Nov. 2014).

Yamada, H., et al. "Si Photonic Wire Waveguide Devices" *IEEE Journal of Selected Topics in Quantum Electronics* 12(6), 1371-1379, (Nov./Dec. 2006).

* cited by examiner

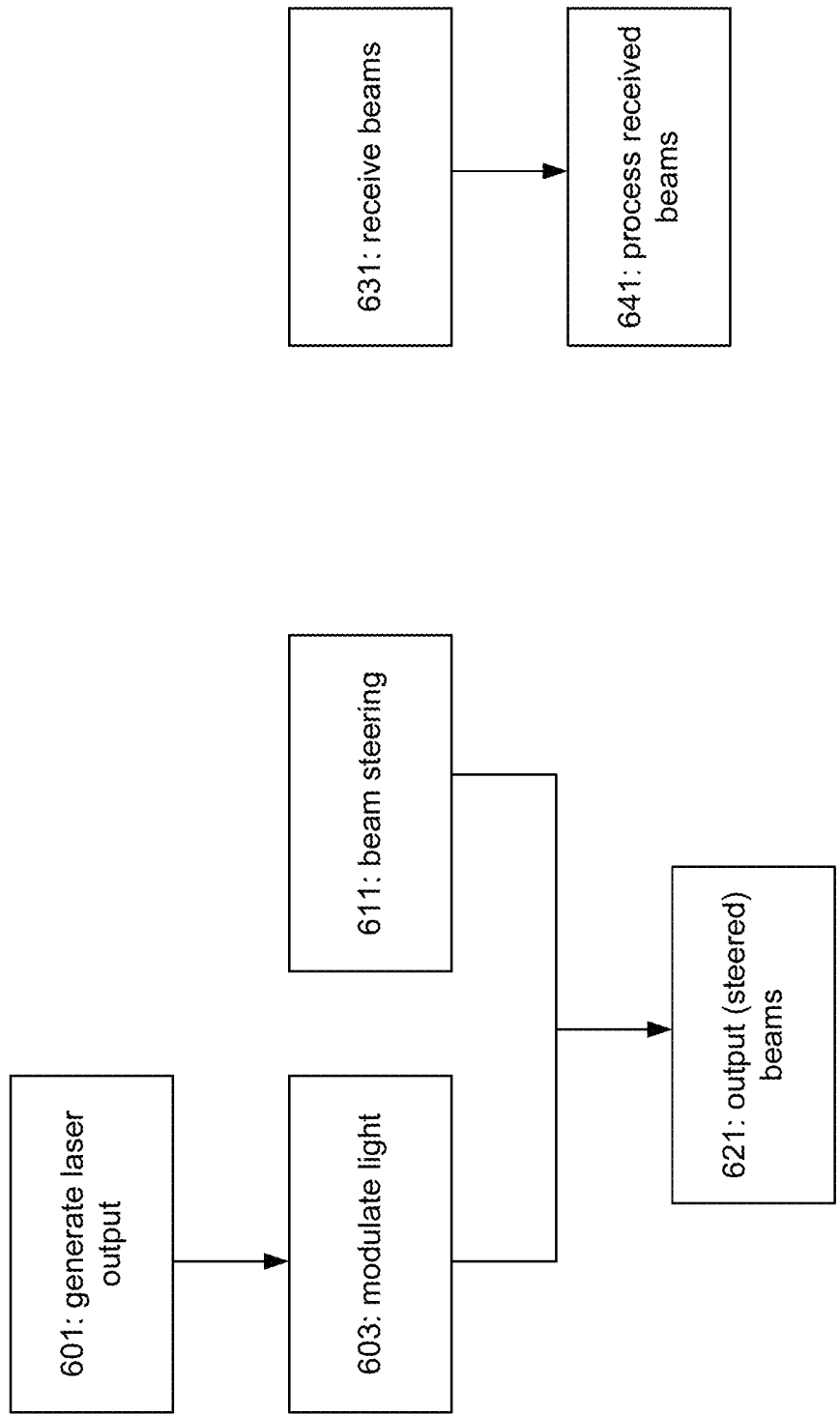

PHOTONIC ANTENNA ARRAY WITH TAPERED FIBER ENDS

CROSS-REFERENCE TO RELATED APPLICATIONS

This application claims priority to U.S. Provisional Patent Application No. 62/776,299, filed Dec. 6, 2018, which is incorporated by reference herein in its entirety.

BACKGROUND

Conventional satellite communications utilize radiofrequency (RF) communications. However, the frequency ranges used for RF communications are becoming more and more crowded and are bandwidth-limited. Optical satellite communications using lasers are being explored, with some optical satellite communication systems having been tested. However, existing optical satellite communication systems suffer from many drawbacks, such as reliance upon heavy equipment, complicated and expensive system configurations, low telescope slew rate, low reliability, and/or inability to handle high power (e.g., in the kilowatt (kW) range or higher).

Optical systems are also used in directed energy applications, which are typically much higher power than communications applications (e.g., on the order of hundreds of kW versus low power on the order of ~10 W for communications). Conventional directed energy systems suffer from many of the same drawbacks as conventional optical satellite communication systems.

In particular, conventional approaches to optical communication systems and directed energy systems typically either use a tiling approach (which suffers from low efficiency and output intensity) or a diffractive approach (which suffers from low reliability due to all of the system light being directed through single components).

Additionally, liquid crystal technology is also being explored, but liquid crystal approaches also have various drawbacks, such as low scalability.

SUMMARY

In an exemplary embodiment, the present application provides a photonic antenna array. The photonic antenna array includes: a plurality of tapered fiber ends, wherein each tapered fiber end of the plurality of tapered fiber ends corresponds to a respective fiber of a plurality of fibers; and a support plate, wherein a portion of each of the plurality of fibers is run through the support plate; wherein a fiber core diameter at a tapered end point of a respective tapered fiber end of the plurality of tapered fiber ends has a first diameter, wherein a fiber core diameter at a non-tapered portion of the respective fiber corresponding to the respective tapered fiber end has a second diameter, and wherein the first diameter is smaller than the second diameter; and wherein the respective tapered fiber end is configured to provide a mode field diameter larger than a diameter of the non-tapered portion of the respective fiber corresponding to the respective tapered fiber end.

In another exemplary embodiment, the present application provides a light output system. The light output system includes: a transmitter system comprising a plurality of laser channels and a plurality of phase shifters; a photonic antenna array comprising a plurality of tapered fiber ends, wherein each tapered fiber end is configured to output a beam corresponding to a respective laser channel of the plurality of laser channels; and a controller, wherein the controller is configured to control the plurality of phase shifters to provide phased array beam steering with respect to an aggregate output provided by the photonic antenna array.

In yet another exemplary embodiment, the present application provides a fiber. The fiber includes: a clad having a clad diameter; a core having a core diameter; a non-tapered portion, wherein in the non-tapered portion of the fiber, the clad diameter is a non-tapered clad diameter and the core diameter is a non-tapered core diameter; and a tapered fiber end, wherein the tapered fiber end comprises a tapered portion of the fiber terminating in a taper point at an end of the fiber, wherein in the tapered portion of the fiber, the clad diameter decreases to be smaller than the non-tapered clad diameter and the core diameter decreases to be smaller than the non-tapered core diameter, and wherein at the taper point, the core diameter is less than 5 μm; wherein the tapered portion of the fiber is configured to output a collimated light beam having a mode field diameter larger than the non-tapered clad diameter.

BRIEF DESCRIPTION THE DRAWINGS

Figure 3A:
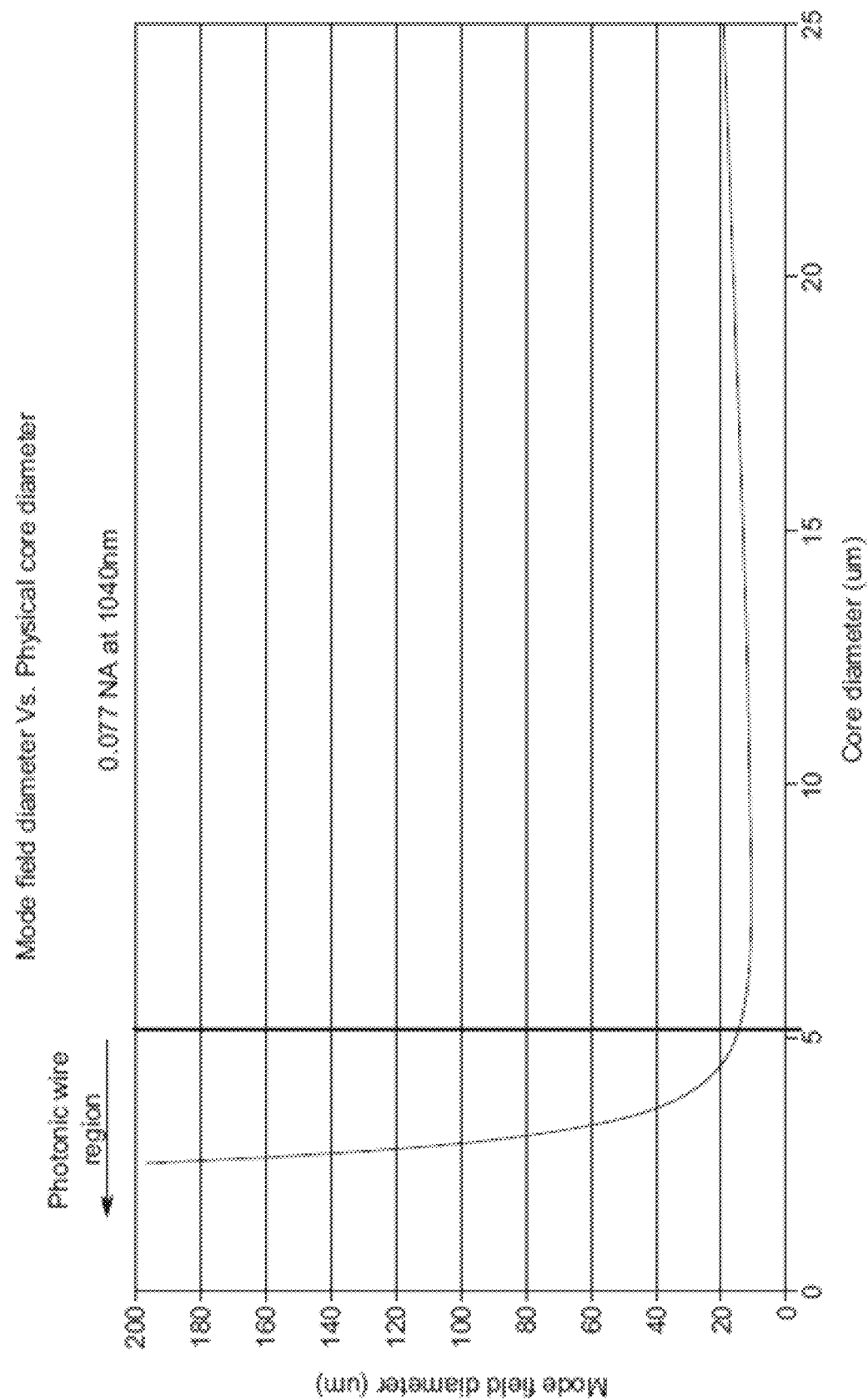
Figure 3B:
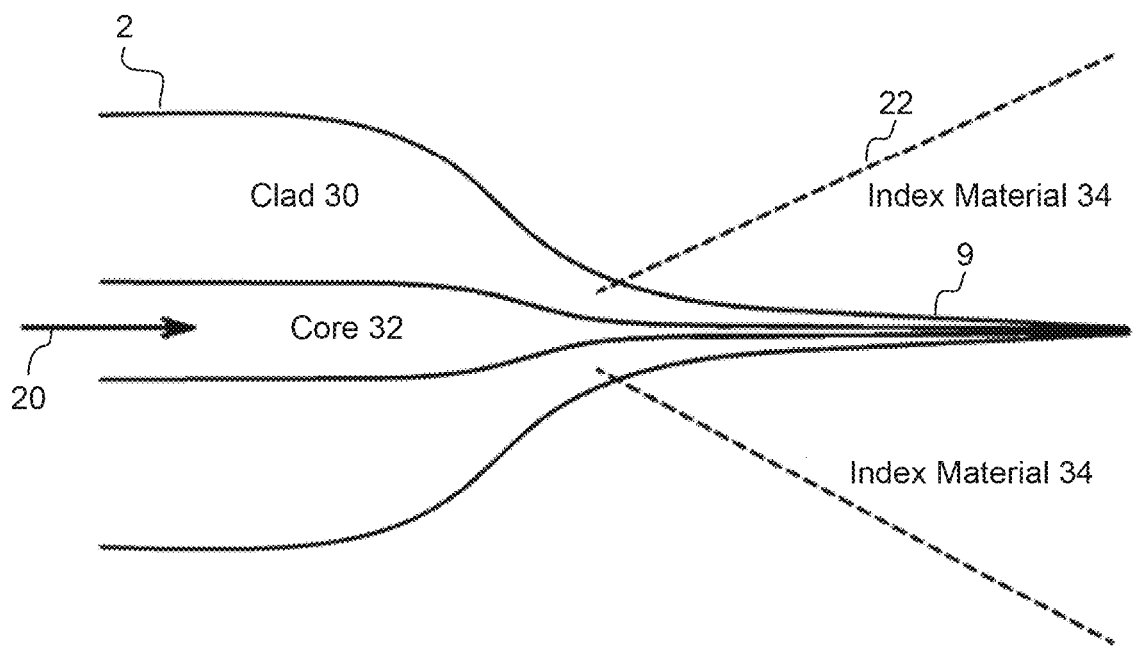
Figure 3C:
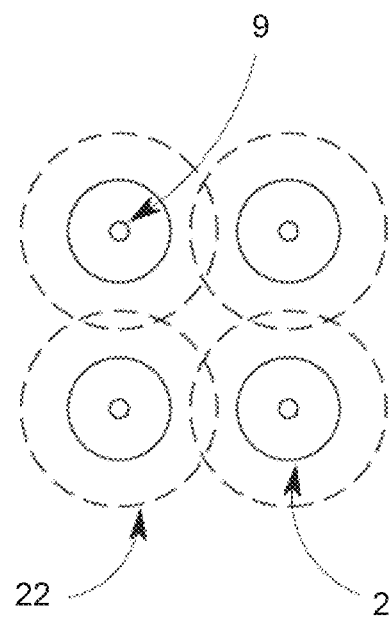

FIGS. 3A-3C provide a plot and schematic diagrams depicting working principles of exemplary embodiments of the present application.

Figure 4B:
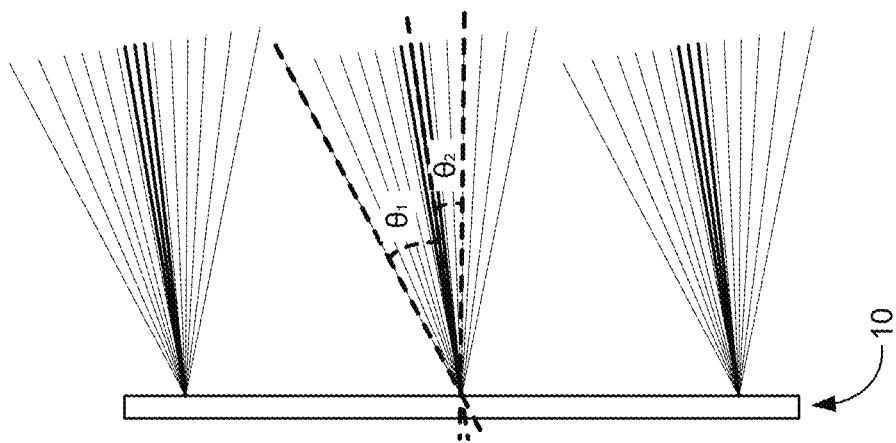
Figure 4A:
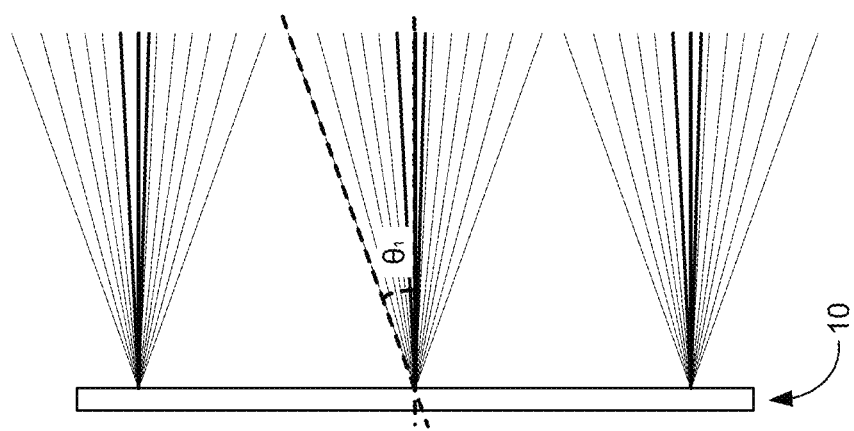

FIGS. 4A-4B are illustrations depicting examples of beam steering capabilities provided by a photonic antenna array in accordance with exemplary embodiments of the present application.

Figure 5B:
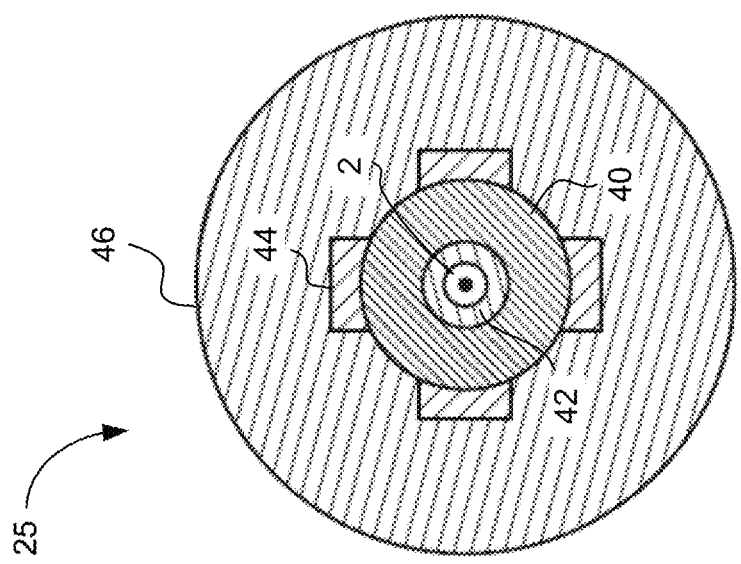
Figure 5A:
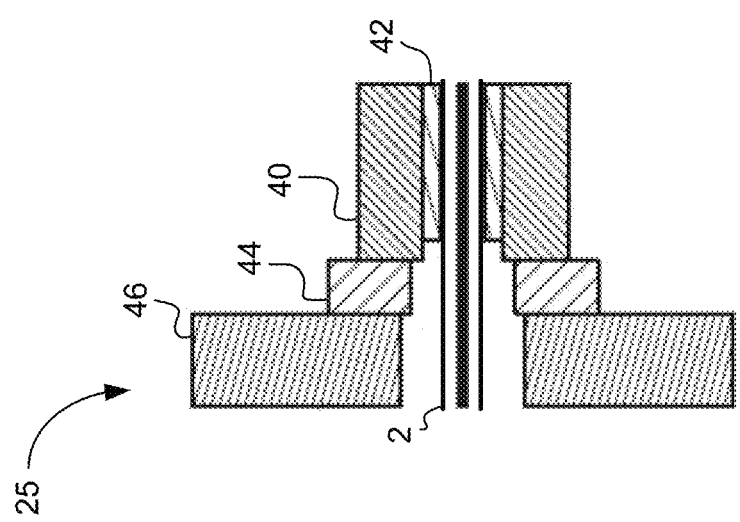

FIGS. 5A-5B are schematic diagrams depicting an example of a positioner in accordance with an exemplary embodiment of the present application.

Figure 6C:
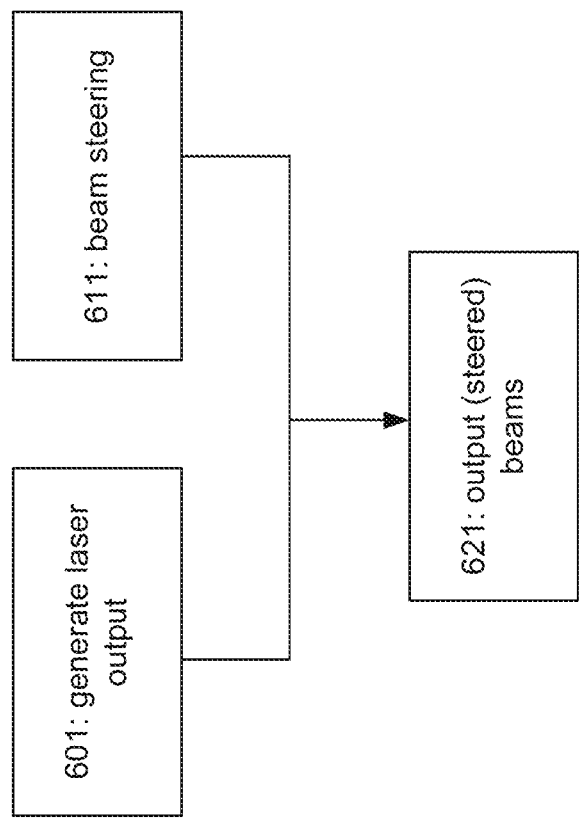

FIGS. 6A-6C are flowcharts depicting exemplary processes for utilizing photonic antenna arrays in accordance with exemplary embodiments of the present application.

Figure 7:
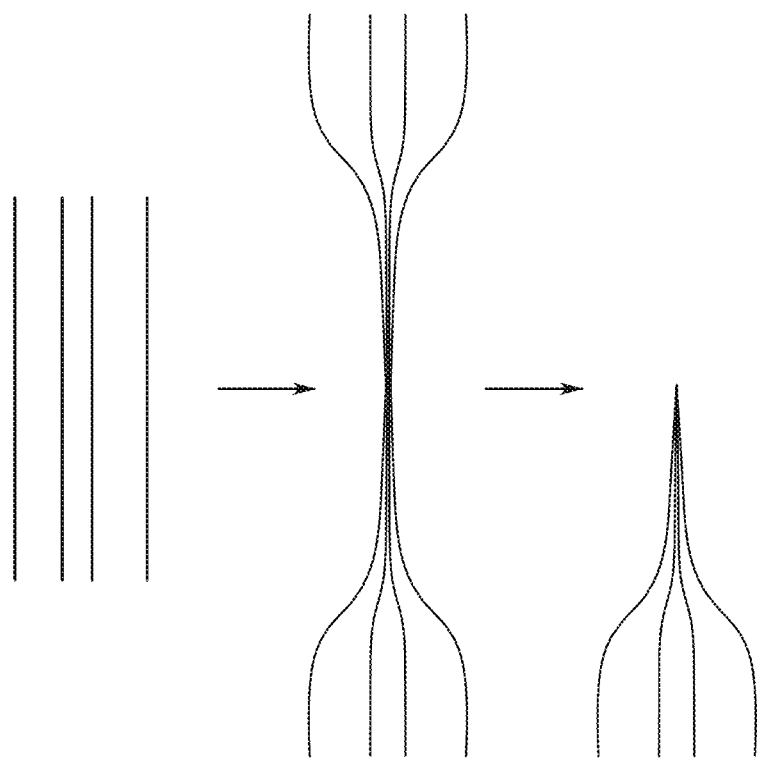
Figure 7:
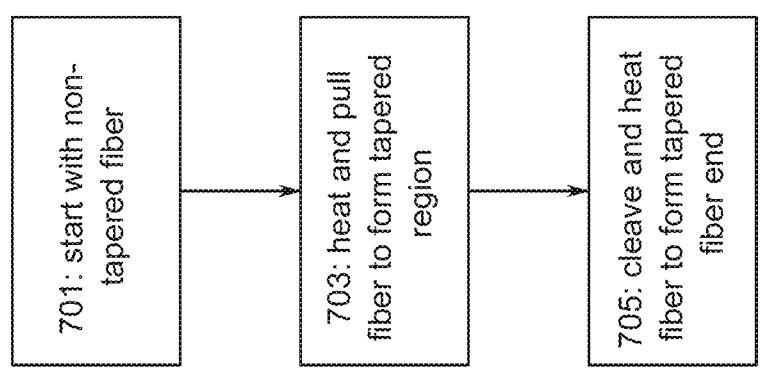

FIG. 7 is a flowchart depicting an exemplary process for forming a fiber having a tapered fiber end in accordance with exemplary embodiments of the present application.

Figure 8:
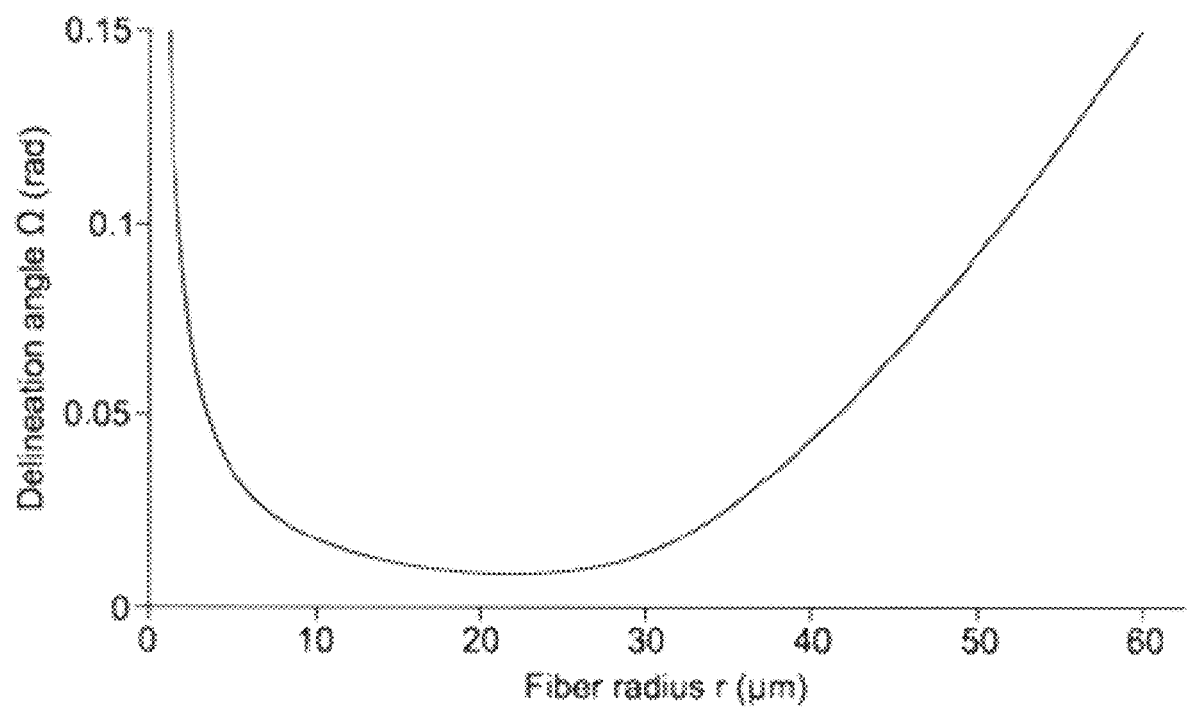

FIG. 8 is a graph showing calculated delineation angle $\Omega$ as a function of the fiber radius r of a step index fiber for the wavelength ($\lambda$)=852 nm.

Figure 9A:
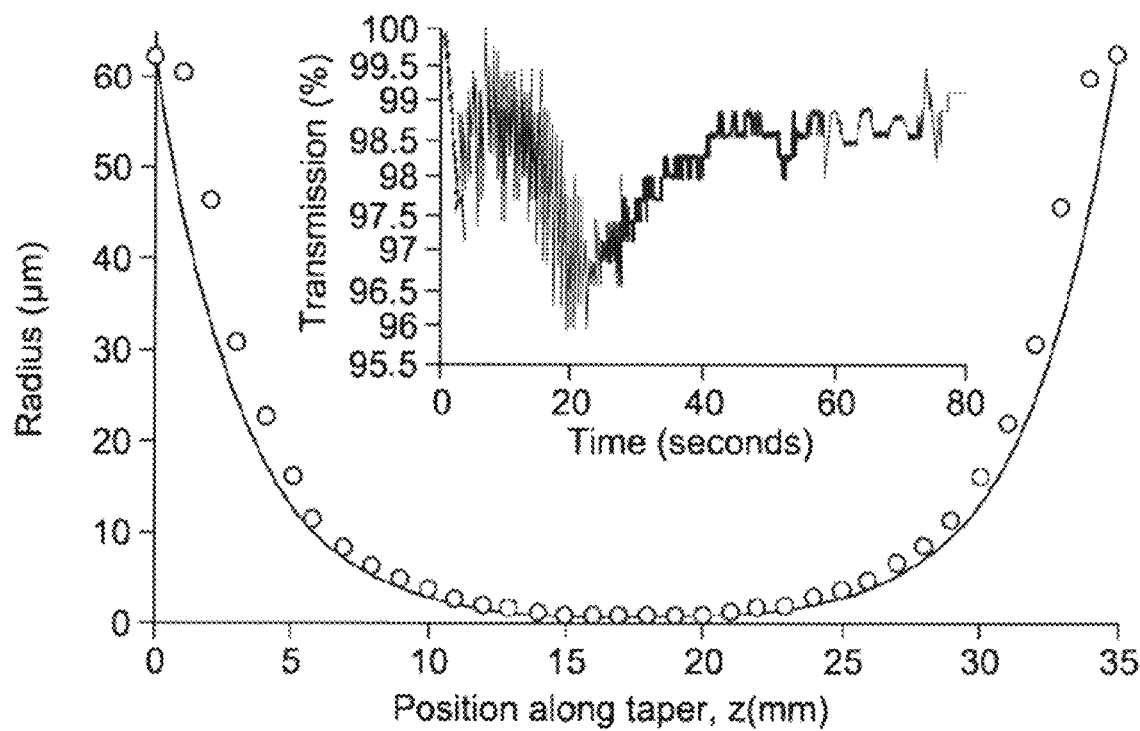
Figure 9B:
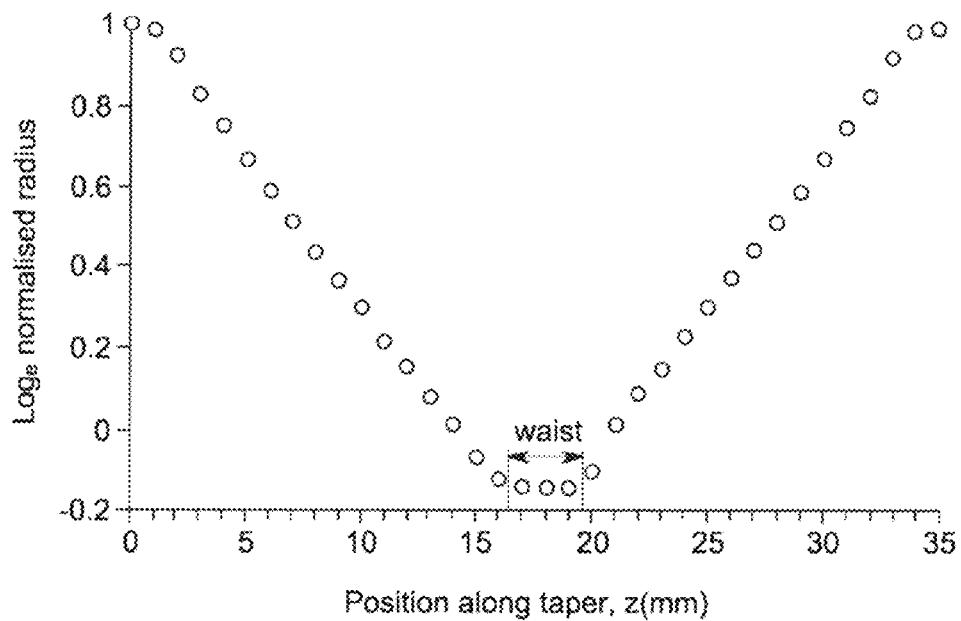

FIGS. 9A-9B are graphs illustrating characteristics of an exponential tapering example that satisfies the adiabatic criterion.

DETAILED DESCRIPTION

Exemplary embodiments of the present application provide a photonic antenna array that allows for vastly improved optical satellite communication systems and directed energy systems to be achieved relative to existing approaches. Optical communication systems incorporating photonic antenna arrays of exemplary embodiments of the present application can be compact, lightweight and accurately steerable while still providing high-speed and highly power-efficient communications, thereby supporting gigabit level and higher data rates for spacecraft having numerous and complex sensors. Additionally, directed energy systems including photonic antenna arrays of exemplary embodiments of the present application can also be compact, lightweight and accurately steerable while providing highly efficient directed energy output beams at high power. For example, exemplary embodiments of the present application are able to achieve a far field central lobe efficiency of almost 100%, whereas conventional tiling approaches are only able to achieve 60-70%. At the same time, exemplary embodiments of the present application achieve the reliability of tiling approaches based on no single optical element of the system seeing the whole power of the system.

The photonic antenna array may include densely packed photonic antennas, wherein each photonic antenna corresponds to a tapered fiber end. Because each tapered fiber end is tapered in such a way as to provide a large mode field diameter (MFD) greater than the diameter of the fiber, the photonic antenna array is able to achieve high fill factor and high far field combining efficiency, so as to be operable as a phased array capable of fast slewing and fine beam steering. These photonic antenna arrays are thus highly advantageous for use in low earth orbit (LEO)-to-LEO optical links, LEO-to-geocentric orbit (GEO) optical links, and LEO-to-ground optical links, as well as in other types of applications such as directed energy applications.

The photonic antenna array may further include positioners (including, for example, lead zirconate titanate (PZT) transducers) corresponding to the respective photonic antennas to provide additional electronic beam steering functionality by physically pointing the photonic antennas within a corresponding range of motion. Through phased array operation and/or physical pointing, precise and accurate beam steering can be achieved. The range of angles achievable via phased array operation may be similar to the range of angles achievable through RF phased arrays (e.g., ~120 degrees), and in a system that is both capable of phased array operation and which has positioners, the range of angles achievable for beam steering is enhanced even more (see FIG. 4B below and corresponding discussion).

Additionally, the photonic antenna array may have a thin support plate and, due to being fiber-fed and being lightweight, may be arranged as a conformal antenna aperture mounted on the side of a spacecraft.

Figure 1A:
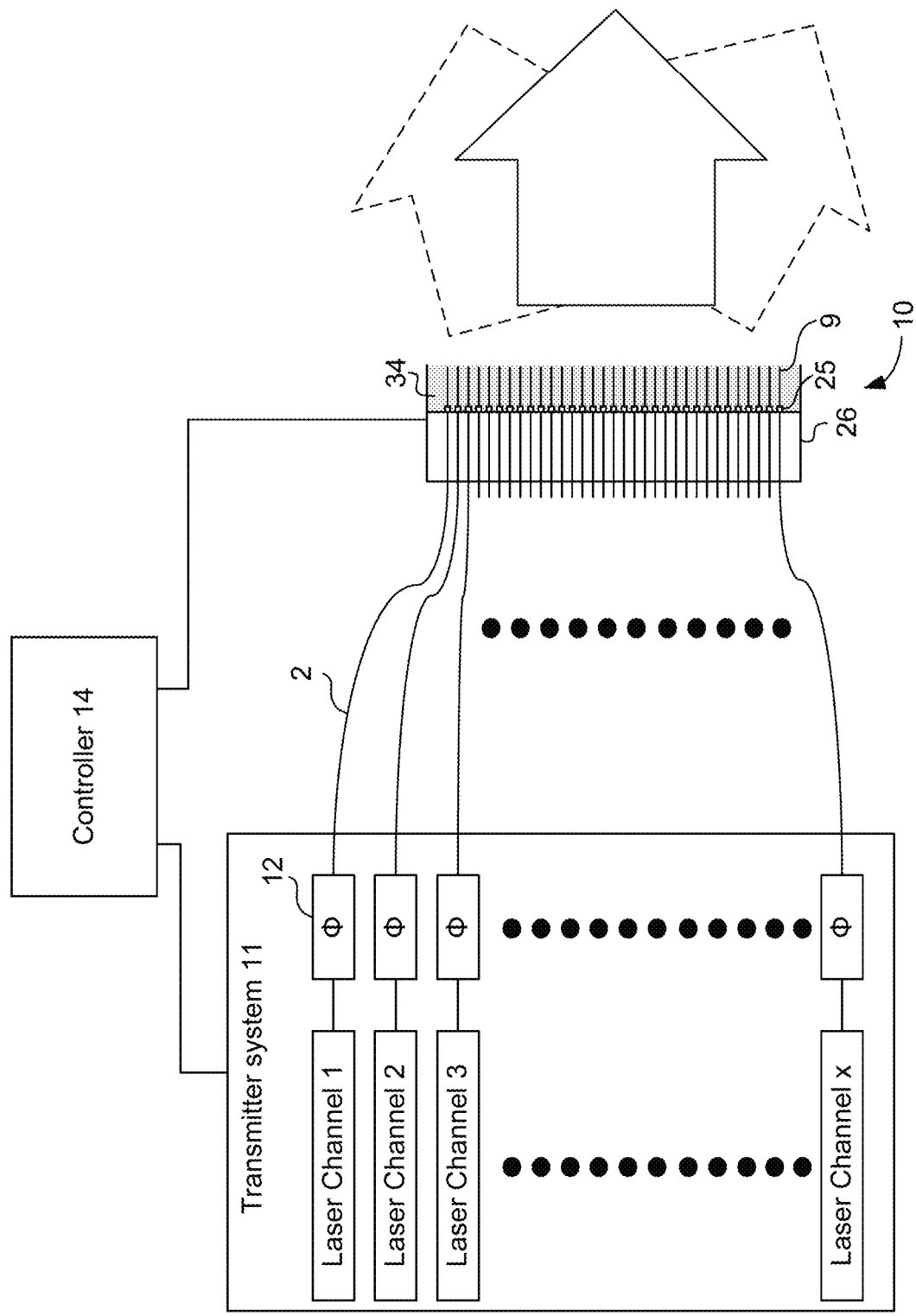
FIG. 1A is a block diagram depicting an exemplary photonic antenna array connected to a transmitter system in accordance with an exemplary embodiment of the present application.

FIG. 1A is a block diagram depicting an exemplary photonic antenna array connected to a transmitter system 11 in accordance with an exemplary embodiment of the present application. The system includes a transmitter system 11 having one or more lasers providing laser channels 1 through x, wherein each laser channel corresponds to a respective fiber 2. The system includes a photonic antenna array 10 having x number of fibers running through a support plate 26, wherein a tapered fiber end 9 of each respective fiber acts as a respective photonic antenna of the photonic antenna array 10. The tapered fiber ends 9 of the photonic antenna array 10 may be encapsulated in an index material 34 (e.g., an outer edge of the outer surface of the photonic array may have a wall protruding therefrom, such as an outer ring disposed on a circular photonic antenna array, with the space within the wall being filled with index material 34 to facilitate and control the beam expansion out from the tapered part of the fiber). The support plate 26 may be made of a lightweight and dimensionally-stable material such as carbon fiber. The portion of each respective fiber 2 passing through the support plate 26 is non-tapered. The tapering for each respective fiber 2 begins in the respective tapered fiber end 9 which protrudes from an outer surface of the photonic antenna array 10. The photonic antenna array 10 further includes a respective positioner 25 corresponding to each of the respective photonic antennas, wherein each respective positioner 25 is configured to actuate a corresponding tapered fiber end 9 to point the corresponding tapered fiber end 9 in a desired direction. The positioners 25 may be disposed around non-tapered portions of the fibers 2 (e.g., each respective positioner 25 may have an annular shape with a through-hole through which a corresponding fiber 2 is run). The system further includes a plurality of phase shifters 12 to provide for phased array operation, each respective phase shifter corresponding to a respective fiber 2 and a respective laser channel.

Each respective laser channel has corresponding components for generating a desired output forming a portion of the overall output beam. For example, in an exemplary embodiment, the transmitter system 11 include a respective laser for each laser channel. With such a configuration, and due to the multi-fiber feed, very high powers can be synthesized through the use of multiple small sources such as vertical cavity surface emitting lasers (VCSELs) or fiber-amplified sources. In another exemplary embodiment, the transmitter system 11 may include less than x lasers—for example, multiple lasers each having multiple laser channels or one laser having x laser channels. In one exemplary implementation, the transmitter system 11 include multiple VCSELs phase-locked to a single local oscillator. In another exemplary implementation, the transmitter system 11 include a single VCSEL split into multiple channels, with each channel having a respective phase shifter for phased array beam steering (this may be useful, for example, in low power communications). The number of laser channels used in a system may be based on a desired final divergence (or "aperture") and overall power output. It will be appreciated that each laser channel depicted in FIG. 1A may include respective amplitude modulators, phase modulators, polarization controllers, large path length controllers, fiber amplifier components, and/or other components for generating laser outputs having, a desired set of characteristics.

Figure 2A:
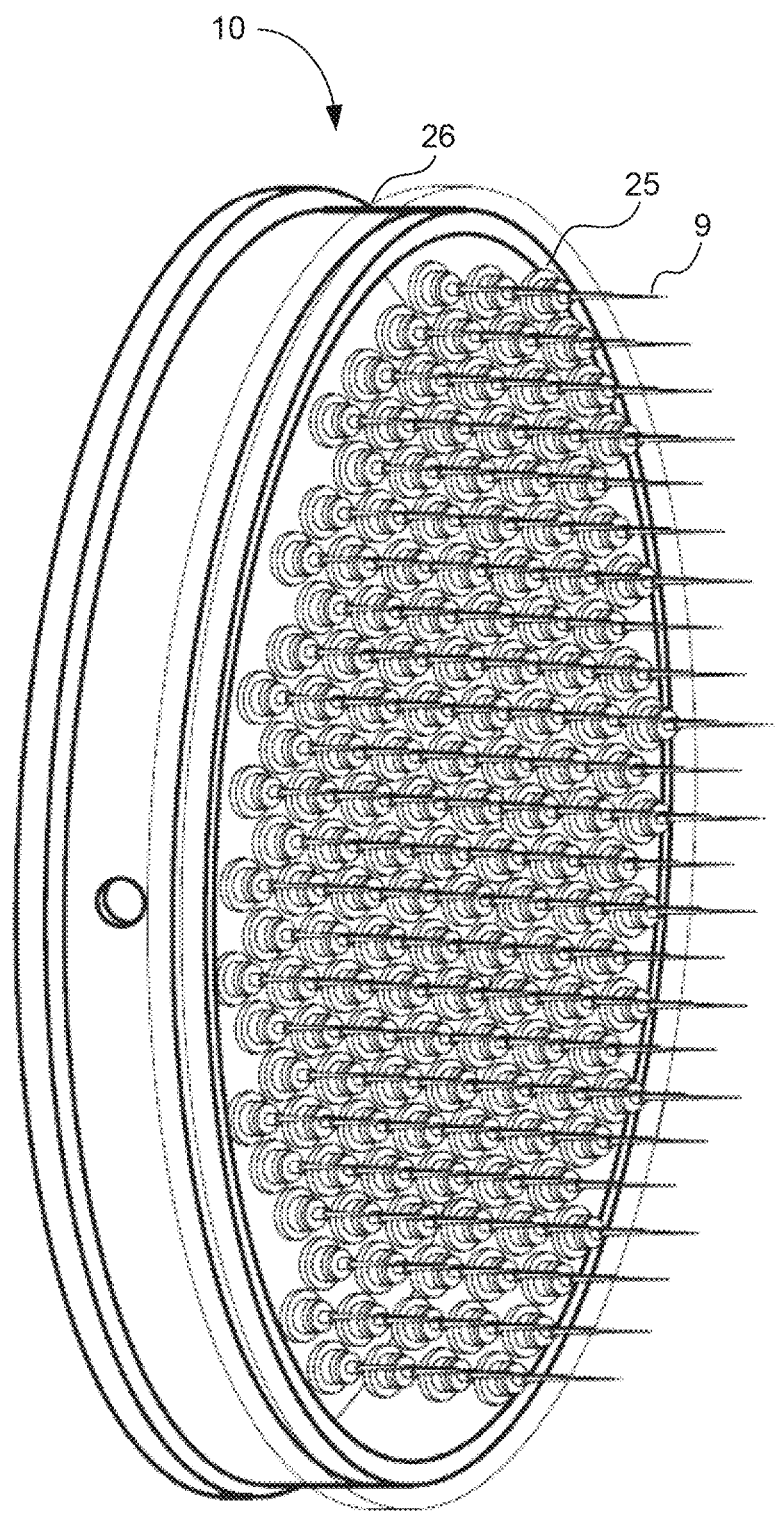
FIGS. 2A-2B are schematic diagrams depicting an exemplary photonic antenna array in accordance with an exemplary embodiment of the present application.
Figure 2B:
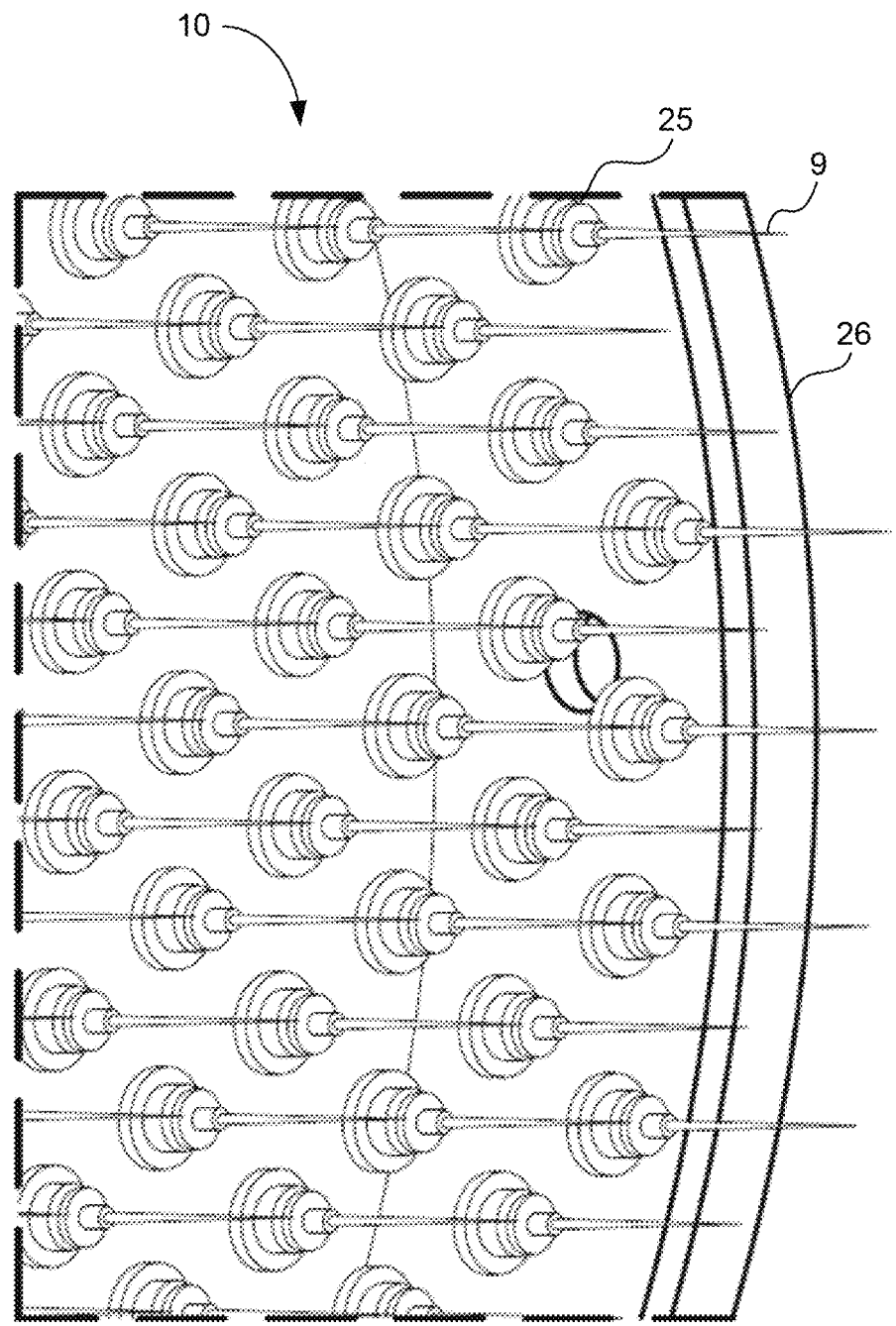

FIGS. 2A-2B are schematic diagrams depicting an example of a photonic antenna array 10 (without depicting the index material 34 or the outer wall surrounding the index material 34). The support plate 26 may be lightweight, and because the photonic antenna 10 is fed with fibers (also lightweight), the overall profile of the photonic antenna array 10 can be very thin (e.g., having a width of <100 mm, with the width of the support plate itself being <5 mm). For example, in the satellite communication context, such photonic antenna arrays can be rigidly mounted on the side of a spacecraft in a conformal manner (and to the extent there is a small amount of flex, the flex can be accounted for using phase control).

A controller 14 of the system (which may be a single controller or which may include multiple separate controller components), provides various control functions with respect to the components of the one or more laser channels, the phase shifters 12, and the positioners 25. The controller 14 may actuate the positioners 25 to provide "coarse" steering for the plurality of tapered fiber ends 9 of the photonic antenna array 10 (by physically pointing the tapered fiber ends 9 in a desired direction), and may further control the phase shifters 12 to impart respective phase shifts for each of the respective laser channels to further provide "fine" steering for light output from the plurality of tapered fiber ends 9 of the photonic antenna array 10. The amount of phased array "fine" steering provided by the phase shifters 12 is based on phase relations between the respective outputs at respective photonic antennas of the photonic antenna array 10. The controller 14 may also utilize the phase shifters 12 to provide array phase control to account for path length differences in the fibers (in addition to adding phase offsets for beam steering).

It will be appreciated that the positioners 25 may be optional. In an exemplary embodiment without the positioners 25, electronic beam steering is provided through the phased array operation of the phase shifters 12, which provides for beam steering up through an angle corresponding to beam divergence (the divergence of the single beam corresponds to the exit aperture via diffraction, and for multiple coherently combined beams, the overall divergence is determined by the width of the entire aperture). In another exemplary embodiment, the positioners 25 are included, and together with the electronic beam steering provided through the phase shifters 12, the overall steering angle is increased beyond the angle corresponding to beam divergence.

In communications applications (such as for optical satellite communications), the controller 14 may further provide for modulation of data onto the light carried through the respective fibers, for example, by directly modulating the intensity of the output on each of the laser channels. Alternatively, the controller 14 may cooperate with one or more modulators (such as phase modulators or polarization modulators) of the respective laser channels to modulate another characteristic of the light. In an exemplary embodiment, a type of modulation known as LOCKSET modulation may be used. In directed energy applications, data modulation would not be needed, and the transmitter system 11 may instead be referred to as a directed energy output system.

The controller 14 may also provide for monitoring and control of phase and polarization to facilitate coherent combining with respect to overlapping light beams, for example, using similar techniques as those performed in RF radar systems, in LOCKSET systems, and/or coherently combined laser systems for directed energy applications.

The controller 14 may include hardware, software, firmware or a combination thereof. For example, the controller 14 may include one or more processors or chips with one or more non-transitory memories associated therewith for storing processor-executable instructions. Control operations performed by the controller 14 may be executed using the hardware, software, firmware or a combination thereof. The controller 14 may further include a user interface through which a user can provide control commands, or the controller 14 may be in communication with a computing device having a user interface through which a user can provide control commands.

Figure 1B:
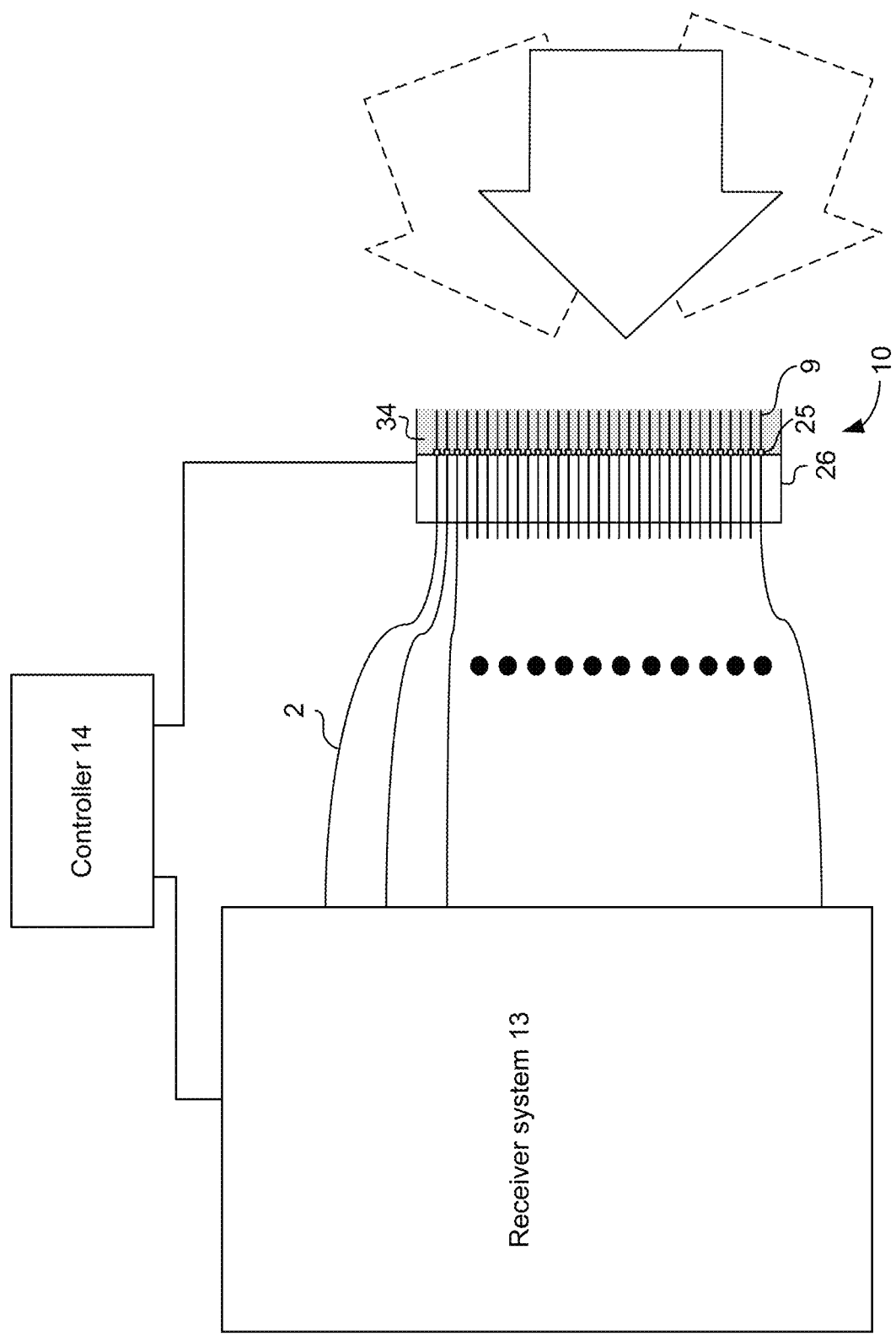
FIG. 1B is a block diagram depicting an exemplary photonic antenna array connected to a receiver system in accordance with an exemplary embodiment of the present application.

FIG. 1B is a block diagram depicting an exemplary photonic antenna array connected to a receiver system 13 in accordance with an exemplary embodiment of the present application. The receiver system 13 provides a coherent receiver which, in effect, provides functionality corresponding to the transmitter system 11 of FIG. 1A such that the photonic antenna array 10 operates in reverse as a collection aperture. Light directed at the photonic antenna array 10 of FIG. 1B is received within fibers 2 and processed through receiver components of the receiver system 13, which may include, for example, amplifiers, phase control components, splitters, and/or other components. It will be appreciated that a variety of coherent receiver configurations may be used for receiver system 13.

Figure 1C:
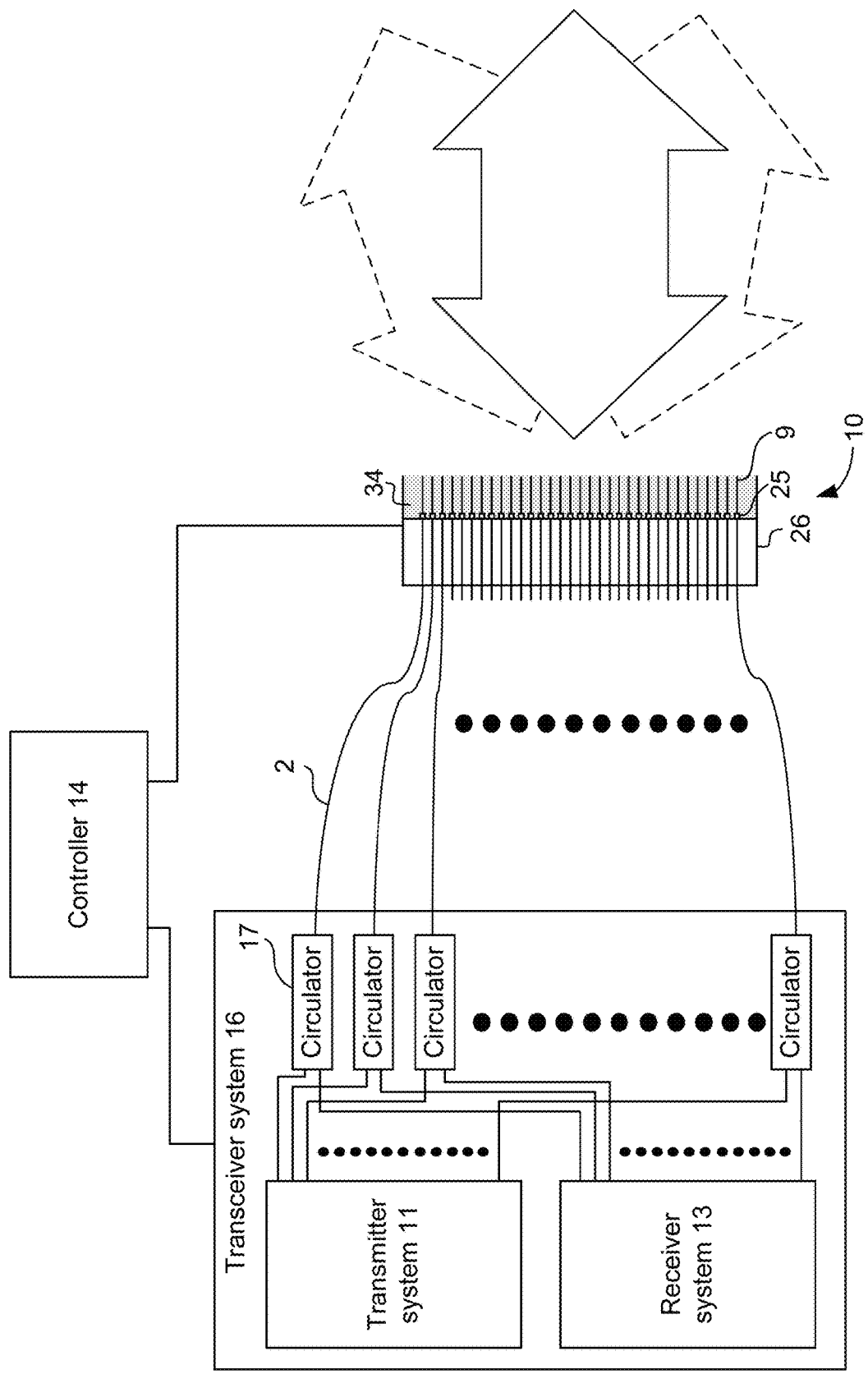
FIG. 1C is a block diagram depicting an exemplary photonic antenna array connected to a transceiver system in accordance with an exemplary embodiment of the present application.

FIG. 1C is a block diagram depicting an exemplary photonic antenna array connected to a transceiver system 16 in accordance with an exemplary embodiment of the present application. The transceiver system 16 may include a transmitter system (such as transmitter system 11 of FIG. 1A) and a receiver system (such as receiver system 13 of FIG. 1B), wherein both the transmitter system 11 and the receiver system 13 are connected to one or more circulator(s) 17 configured for separating light in the forward and backward directions, for example, by using a polarizer. In an exemplary embodiment, there may be a respective circulator connected to each respective fiber 2, wherein the respective circulator directs outgoing light from a respective laser channel onto the fiber 2 and directs incoming light received on the fiber 2 to respective receiver components of the receiver system 13.

It will be appreciated that the systems shown in FIGS. 1A-1C are merely exemplary (i.e., are merely examples). Embodiments of photonic antenna arrays in accordance with the present application may be used in other types of systems and with other system configurations, including a wide range of communications applications, directed energy applications, and other applications.

It will further be appreciated that various types of fiber, various lengths of fiber, and various different photonic antenna array shapes and dimensions may be used. For example, although FIG. 2A depicts an elliptical shape having 149 photonic antennas disposed thereon, other exemplary embodiments of the present application may include other photonic antenna array shapes (such as circular, square, rectangular, hexagonal, etc.), and with a different number of photonic antennas (e.g., 125). The size of the overall photonic antenna array, as well as the density or spacing of photonic antennas within the array, as well as other parameters and dimensions (such as type, diameter and length of fiber, index material, light intensity per fiber, slope of taper, etc.), may be varied based on various factors, including the type of system in which the photonic antenna array is used. The overall divergence and far field beam characteristics of a coherently combined laser array (such as the coherently combined output a photonic antenna array in accordance with exemplary embodiments of the present application) is in accordance with multi-source coherently-combined diffractive optics in telins of the number of individual sources, the source-to-source spacing, and the fill factor between the individual beams.

For example, in an exemplary directed energy application, an overall output aperture of a photonic antenna array may be approximately 12" (~30 cm), with each photonic antenna of the photonic antenna array having an individual aperture of about 1 cm, further with 100+ (e.g., 500-1000) fibers being provided (corresponding to 100+ photonic antennas) with 100+ corresponding laser channels having a total power output of >1 MW. To provide another example, in an exemplary communications application, the overall output aperture of a photonic antenna array may be approximately 4-8". In other exemplary applications, such as for telescopes, the overall output aperture of the photonic antenna array can be further increased to provide a larger range of steering capabilities.

With regard to the slope of the taper, exemplary embodiments of the present application may utilize an "adiabatic" or near-adiabatic taper (e.g., over a length of 5-30 mm) which provides for a gentle enough slope that provides high efficiency through the taper (i.e., conserving brightness by avoiding undesirable scattering and back-reflections). In certain exemplary embodiments, the taper slope may satisfy the adiabatic condition or be more gradual (i.e., less steep) than a slope that would satisfy the adiabatic condition. In other exemplary embodiments, the taper slope may be steeper than a slope that would satisfy the adiabatic condition, but still be gradual enough to provide high efficiency (e.g., less than 10% loss).

With regard to fiber length, an exemplary fiber length between a laser channel and a photonic antenna array may be, for example, 2-3 meters, but it will be appreciated that there is no particular length requirement and other fiber lengths may be used. With regard to fiber type and diameter, virtually any type of fiber may be used, but certain types of fiber and/or certain dimensions of fiber may be suitable for certain application. An example of a fiber that may be used in a communications application is standard telecom fiber having a 6 μm non-tapered core diameter and a 125 μm non-tapered clad diameter, with a taper length of, for example, about 25 mm to 200 mm down to a taper point having an overall diameter (including clad and core) of 10 μm or less or 1 μm or less. An example of a fiber that may be used in a directed energy application includes a large mode area (LMA) fiber having a non-tapered core diameter of 20 μm or more.

FIGS. 3A-3C provide a plot and schematic diagrams depicting working principles of exemplary embodiments of the present application. A photonic antenna array according to an exemplary embodiment of the present application is able to have densely packed photonic antennas provide high fill factor and high far field combining efficiency based on utilizing a large mode field diameter (MFD) greater than the diameter of the fiber.

FIG. 3A is a plot of MFD vs. fiber core diameter for a 0.077 numerical aperture (NA) fiber at 1040 nm which shows the evolution of the MFD as fiber core diameter decreases. At a fiber core diameter of above 10 μm, the MFD is smaller than the fiber core diameter. At a fiber core dimeter less than 10 μm, the MFD begins to become larger than the core diameter, and going below a 5 μm fiber core diameter, the MFD grows exponentially. This region of fiber core diameters (e.g., less than ~5 μm) exhibiting the exponential MFD growth may be referred to as the "photonic wire region." In this region, the evanescent wave is extended considerably outside the fiber core and further outside the fiber clad into an index material (in this example, the medium outside the fiber has the same refractive index as the glass of the fiber). For example, in a nano-taper fiber, such as a telecom-type single mode fiber tapered to a fiber core diameter of less than 1 μm, both the core and the cladding are very small, and the mode field extends out of the glass of the fiber.

Generally speaking, FIG. 3A shows the relationship between tapered core size and output beam size. The smaller the taper, the larger the beam and the less divergence. Thus, the output diameter of a collimated beam can be adjusted by the tapered core size of the fiber, and the degree of collimation in a photonic antenna array is based on the minimum output diameter at the taper point of each fiber in the photonic antenna array.

As will be discussed below in connection with FIG. 7, a fiber can be tapered down to a "taper point" having a fiber core dimeter below 5 μm. The fiber core diameter at the taper point may be as low as, for example, 0.5 μm. Such tapers have shown a demonstrated efficiency of approximately 98%. Thus, using such tapers, a photonic antenna array according to exemplary embodiments of the present application is able to provide nearly 100% of the optical field in the central lobe of the coherently combined light output from the photonic antennas of the photonic antenna array.

FIG. 3B illustrates an exemplary tapered fiber end 9 of a fiber 2. The fiber 2 has a core 32 and a clad 30, wherein in a non-tapered region of the fiber 2, the core 32 (e.g., a large mode array (LMA) core) has a respective non-tapered core diameter and the clad 30 also has a respective non-tapered clad diameter. Light 20 (e.g., multi-kW light from an amplifier) may be carried through the core 32 in the non-tapered region of the fiber 2. In the tapered fiber end 9 part of the fiber 2, the core diameter and the clad diameter decrease down to a taper point corresponding to an end of the fiber 2 where the core 32 has a diameter, for example, of less than 1 μm. The ratio of core diameter to clad diameter may stay approximately the same over the length of the taper. As the core diameter decreases, the MFD 22 increases in accordance with the principles discussed above in connection with FIG. 3A. This results in the MFD 22 at the end of the tapered fiber end 9 being larger than the overall diameter of the fiber 2 in the non-tapered region, such that light originally carried in the core 32 exits the fiber 2 at the tapered fiber end 9 part of the fiber and goes into an index material 34. This can also be seen in FIG. 3C, which illustrates four fibers 2 of a photonic antenna array and the respective MFDs 22 associated therewith.

The light beams exiting the fibers 2 corresponding to the MFDs 22 are collimated, such that the overall output of the photonic antenna array is collimated, and also such that individual tapered fiber ends 2 may be used as individual fiber collimators. Thus, for example, there are also exemplary embodiments of the present application (outside of the context of photonic antenna arrays) in which one or more tapered fiber ends are used to provide for collimation of light carried by one or more respective fiber(s).

Because light travels outside of the fiber 2 to form the MFD 22, the light is affected by the index of refraction of the medium outside of the fiber 2. In certain exemplary embodiments, as shown in FIGS. 1A-1C and FIG. 3B, the tapered fiber ends 9 are encapsulated with an index material 34 having an index of refraction of n>1 to facilitate and control the expansion of the MFD 22. The index material 34 can be a liquid (such as water with n=1.3), can be an index-matching liquid, or can be a resin or polymer with an index of refraction less than that of the core (e.g., which may be made of fused silica). The index material 34 can be chosen to provide a desired amount of MFD expansion.

Alternatively, in certain exemplary embodiments, the medium outside the fiber may simply be air (for which the index of refraction is n=1), in which case the photonic antenna array might not include index material 34 and the outer wall surrounding the index material 34. If the medium outside the fiber is air, the amount of MFD expansion would be less than the amount of MFD expansion for an index material 34 having an index of refraction of n>1.

Due to the working principles of the photonic antennas as shown in FIG. 3B, exemplary embodiments of the present application are able to achieve a very high damage threshold for high power applications (such as kW and MW directed energy applications), as no single component sees the full aggregate power of the system, and each individual fiber has low damage probability and very low back reflections based on the gradual increase of the MFD 22 over the length of the tapered part of the fiber 2.

FIG. 3C further shows that, based on the MFD 22 being larger than the diameters of the fibers 2 and the fibers 2 being placed close together (e.g., closer than the fiber diameters), the MFDs 22 overlap to an extent such that high fill factors can be achieved, leading to high coherent combining efficiency and increased power in the central lobe. And because collimation is achieved through the expansion of the MFDs (which may be referred to herein as "taper point collimation"), a separate collimating component (such as a collimating lens) is not needed. While placing the fibers close together helps to achieve high fill factor, the fibers should also be placed far enough from each other to increase the overall aperture size of the photonic antenna array. Thus, for different applications, there may be different optimal placement configurations and spacings for a given number of total fibers in the array so as to maximize the central lobe peak power at a given distance. For example, the fibers may be placed close enough to each other to achieve high fill factor while still remaining far enough from each other to achieve a desired total aperture size. Conventional tiled coherently combined laser systems, which require fiber laser collimation such that fiber channels cannot be placed close together, cannot achieve these advantages.

As depicted and discussed above with respect to FIG. 1A, phased array operation of the photonic antenna array 10 and/or positions 25 of the photonic antenna array 10 provide for beam steering. FIGS. 4A-4B are illustrations depicting examples of beam steering capabilities provided by photonic antenna arrays in accordance with exemplary embodiments of the present application.

FIG. 4A depicts three exemplary output beams of a photonic antenna array 10 and the respective divergence for each beam. The divergence of a respective single beam corresponds to a maximum steering angle achievable through phased array operation. Thus, in this example depicted in FIG. 4A, the maximum steering angle achievable for the photonic antenna array 10 through phased array operation is $\theta_1$, corresponding to the central lobe of the combined beam being steered to the maximal extent of the divergence of each of the individual beams based on the beams being out of phase. It will be appreciated that only three beams are illustrated in one dimension in this depicted example, but in practice, with a two-dimensional photonic antenna array, beam steering in two dimensions may be performed via phased array operation. It will further be appreciated that such steering is very fast and very precise.

FIG. 4B depicts three exemplary output beams of a photonic antenna array 10, the respective divergence for each beam, and further beam steering capabilities provided by positioners 25. As mentioned above, the maximum steering angle achievable for the photonic antenna array 10 through phased array operation is $\theta_1$. However, if steering in excess of a single beam divergence is desired, positioners 25 may be used to provide further augmented beam steering. For example, the positioners 25 steer the central lobe of each output beam together and by that same amount, thereby providing an additional tilt corresponding to angle $\theta2$. Thus, by employing the phased array operation of the photonic antenna array 10 together with positioners 25, an even wider range of steering angles can be achieved.

In exemplary embodiments of the present application, beam steering may be achieved through actuation of the positioners 25 alone, through phased array operation alone, or through a combination of actuation of the positioners 25 and phased array operation. By combining phased array operation and physical tilting through actuation of the positioners 25 (e.g., as shown in FIG. 4B), beam steering over a wide range of angles along with fine pointing can be achieved in a gimbal-less system. In the satellite communication context, this greatly reduces the need for spacecraft pointing and also greatly lowers the size, weight and power requirements for communication equipment. Furthermore, regardless of which direction the output beams of the photonic antenna array 10 are pointed, the respective expanded beam outputs are still able to achieve high fill factor and coherent combining in the far field.

FIGS. 5A-5B depict an example of a positioner 25 implemented as an actuator assembly having multiple transducers (e.g., PZT transducers). FIG. 5A illustrates a cross-sectional side view of the positioner 25 with a fiber 2, and FIG. 5B illustrates a cross-sectional front view of the positioner 25 with the fiber 2. The actuator assembly may include a reaction plate 46, a tilt transducer 44, a piston transducer 40, and a ferrule 42 disposed around the fiber 2. Based on actuation of the tilt transducer 44 and/or the piston transducer 40, the actuator assembly acts on a non-tapered portion of the fiber to tilt the fiber and/or provide a piston motion along the direction of propagation of the fiber, respectively.

The tilting capability provided by the tilt transducer 44 allows for each respective positioner 25 to tilt a corresponding tapered fiber end in a desired direction over a wide range of angles. The amount (degree) and direction of tilt provided by each respective positioner 25 may be controlled based on control signals supplied by a controller (e.g., by the controller 14 in electrical communication with the respective positioners 25 of the photonic antenna array 10).

Further, the piston motion capability provided by the piston transducer 40 may be used to account for flex in the photonic antenna array, to offset differences in fiber lengths, and/or for phased array operation. For example, in addition to or instead of relying on phase shifters 12 as depicted in FIG. 1A to impart phase shifts for phased array operation, the piston motion provided along the direction of propagation by respective piston transducers corresponding to multiple tapered fiber ends may impart different phase offsets to the corresponding tapered fiber ends (by increasing or decreasing respective protrusion lengths for the respective tapered fiber ends). The amount of displacement (corresponding to an amount of piston motion) provided by each respective positioner 25 may be controlled based on control signals supplied by a controller (e.g., by the controller 14 in electrical communication with the respective positioners 25 of the photonic antenna array 10).

It will be appreciated that although the steering capabilities associated with phased array operation and/or physical tilting of the tapered fiber ends are discussed above with respect to output beam steering (e.g., for data transmission or directed energy), these principles are also applicable to receiving. For example, through phased array processing in which phase offsets are applied on the receiving end, as well as through physical tilting of the tapered fiber ends, the directional sensitivity of a photonic antenna array acting as a receiver may be adjusted.

FIGS. 6A-6C are flowcharts depicting exemplary processes for utilizing photonic antenna arrays in accordance with exemplary embodiments of the invention.

FIG. 6A is a flowchart depicting an exemplary transmission process for transmitting data using a photonic antenna array in accordance with an exemplary embodiment of the invention. At stage 601, a laser output is generated for one or more laser channels and respective fibers corresponding thereto (e.g., using a photonic antenna array 10 and a transmitter system 11 as depicted in FIG. 1A or 1C), and at stage 603, the light is modulated with data (e.g., using modulation components controlled by controller 14). At stage 611, beam steering may also be provided, for example, through phased array operation (e.g., via controller 14 and phase shifters 12) and/or physical tilting of tapered fiber ends of the photonic antenna array (e.g., via positioners 25). At stage 621, the beams are output (i.e., transmitted to a receiver in the communication context), wherein the direction of output may be based on beam steering as provided in stage 611.

FIG. 6B is a flowchart depicting an exemplary reception process for receiving data using a photonic antenna array in accordance with an exemplary embodiment of the invention. At stage 631, light beams carrying data are received (e.g., using a photonic antenna array 10 and a receiver system 13 as depicted in FIG. 1B or 1C). For example, the light beams carrying the data may be output according to a process as shown in FIG. 6A using a system such as the system shown in FIG. 1A or 1C. Stage 631 may include directional reception through phased array operation (e.g., via applying appropriate phase shifts to steer a direction of sensitivity of the photonic antenna array) and/or physical tilting of tapered fiber ends of the photonic antenna array (e.g., via positioners 25). At stage 641, the received beams are processed to obtain the data carried by the beams (e.g., via a demodulation process performed by receiver system 13).

FIG. 6C is a flowchart depicting an exemplary directed energy output process using a photonic antenna array in accordance with an exemplary embodiment of the invention. At stage 601, a laser output is generated for one or more laser channels and respective fibers corresponding thereto (e.g., using a photonic antenna array 10 and a transmitter system 11 as depicted in FIG. 1A). At stage 611, beam steering may also be provided, for example, through phased array operation (e.g., via controller 14 and phase shifters 12) and/or physical tilting of tapered fiber ends of the photonic antenna array (e.g., via positioners 25). At stage 621, the beams are output (i.e., directed at a target in the directed energy context), wherein the direction of output may be based on beam steering as provided in stage 611. It will be appreciated that FIG. 6C is similar to FIG. 6A, except that data modulation is not needed in the directed energy context, and that the aggregate power level of the output is typically much higher in the directed energy context relative to the communications context.

FIG. 7 is a flowchart depicting an exemplary process for forming a fiber having a tapered fiber end in accordance with exemplary embodiments of the present application. The process starts at stage 701 with a non-tapered fiber having a uniform core diameter and a uniform clad diameter throughout the length of the fiber. At stage 703, heat is applied to a center heating area (e.g., using electronic discharge or a $CO_2$ laser) while the fiber is clamped (e.g., at two ends) so as to soften the portion of the fiber in the center heating area, and the fiber is pulled apart at an appropriate tension level to reduce the diameter of the fiber and form a tapered region including both a down-taper and an up-taper. It will be appreciated that, although the fiber diameter varies in the tapered region as a result of the tapering, the core-to-clad ratio remains the same over the length of the tapered region. Stage 703 may be performed using equipment such as a vacuum tapering machine, with appropriate corresponding software being used to monitor and control the tapering process to achieve a desired taper slope and minimum core/clad diameter. At stage 705, the tapered fiber is cleaved at a desired point (e.g., the point having the minimum core/clad diameter) to form a half-taper to be used as a tapered fiber end of a photonic antenna array. The cleaving process may include, for example, application of tension (e.g., via a diamond blade) to cut the fiber at the desired point, followed by application of heat after cleaving to smooth out or round out the cleaved and tapered-down end of the fiber.

As mentioned above, exemplary embodiments of the present application may utilize an "adiabatic" or near-adiabatic taper which provides for a gentle enough slope that provides high efficiency through the taper (i.e., conserving brightness by avoiding undesirable scattering and back-reflections). A tapered fiber may be considered adiabatic if the taper angle is small enough such that there is negligible power coupling from the fundamental mode to higher-order modes. The following provides an example of adiabaticity criteria for delineating such conditions. The delineation angle $\Omega(r)$ as a function of the local taper radius r is given by the following length-scale criterion:

$$\Omega(r) = r/2\pi(\beta 1(r) - \beta 2(r))$$

where $\beta 1(r)$ and $\beta 2(r)$ are the propagation constants of the fundamental (HE11) and the first excited (HE12) modes, respectively. If the local taper angle $\theta(r)$ is much smaller than $\Omega(r)$, the mode coupling is negligible and the fundamental mode propagates adiabatically. An adiabaticity factor $F(>0)$ can be used to express this condition as follows:

$$\theta(r) < F\Omega(r)$$

Smaller F values lead to reduced mode coupling. FIG. 8 is a plot of delineation angle vs. fiber radius of a step index fiber calculated with Mathematica (Wolfram Research) using the three-layer model. With the wavelength $\lambda=852$ nm and with the refractive indices and the radii of the core and cladding as follows: ncore=1.4574; nclad=1.4525; rcore=2.4 μm; rclad=62.5 μm.

When this criterion is satisfied, ultra low loss tapers of almost any size core diameter can be created. FIGS. 9A and 9B are graphs corresponding to an example of such a taper that satisfies the adiabatic criterion. The taper shown is an exponential taper of approximately 30 mm long. The graph in FIG. 9A shows the taper shape with an inset showing the transmission % of the taper over time as the taper was being drawn during fabrication. This taper was pulled actively in that an optical signal was coupled into the fiber as the taper was being pulled. As shown in the inset, the taper achieved approximately 98.5% transmission efficiency. In other exemplary embodiments, transmission efficiencies of over 99% can be achieved. The graph in FIG. 9B is the log normal plot of the taper showing adherence to the exponential shape of the taper.

In the exponential tapered profile of the graph of FIG. 9A, the corresponding measured waist diameter was ~1.1 μm. The pull length was 30 mm, and the flame travel distance (during heating) was set to 3 mm. The solid line is a fit. The limited resolution (1 μm) of the microscope and finite width of the flame account for the difference between the set flame travel distance and the motion of the flame for making the taper.

Exemplary embodiments of photonic antenna arrays discussed herein, as well as systems incorporating such photonic antenna arrays, are usable in a wide variety of different applications. For example, as a receiver, photonic antenna arrays of exemplary embodiments of the present application may be used in ultra-lightweight astronomical telescopes that can be used in space with fiber photonic signal processing. To provide another example, photonic antenna arrays of exemplary embodiments of the present application may be used as transmitters, receivers, and/or transceivers in large networks of optical communications crosslink networks for global communications and deep space coverage, such as large-scale satellite networks with satellites numbering in the thousands. There are also other applications of photonic antenna arrays of exemplary embodiments of the present application, such as for scanning, range-finding, directed energy, light detection and ranging (LIDAR), jamming and multi-beam applications, as well as for high peak power lasers on the petawatt scale. Further, because collimating lenses and gimballed telescopes are not needed with respect to photonic arrays of exemplary embodiments of the present application, greatly simplified construction of such systems can be achieved.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A photonic antenna array, comprising:
    a plurality of tapered fiber ends, wherein each tapered fiber end of the plurality of tapered fiber ends corresponds to a respective fiber of a plurality of fibers; and
    a support plate, wherein a portion of each of the plurality of fibers is run through the support plate;
    wherein a fiber core diameter at a tapered end point of a respective tapered fiber end of the plurality of tapered fiber ends has a first diameter, wherein a fiber core diameter at a non-tapered portion of the respective fiber corresponding to the respective tapered fiber end has a second diameter, and wherein the first diameter is smaller than the second diameter; and
    wherein the respective tapered fiber end is configured to provide a mode field diameter larger than a diameter of the non-tapered portion of the respective fiber corresponding to the respective tapered fiber end.

2. The photonic antenna array according to claim 1, wherein the respective tapered fiber end comprises an adiabatic taper from the second diameter to the first diameter.

3. The photonic antenna array according to claim 1, wherein multiple tapered fiber ends of the plurality of tapered fiber ends are configured to provide overlapping mode fields.

4. The photonic antenna array according to claim 3, wherein the overlapping mode fields each comprise collimated light, and the collimated light is coherently combined in overlapping areas of the overlapping mode fields.

5. The photonic antenna array according to claim 1, further comprising:
    a plurality of positioners, wherein each positioner is configured to actuate a respective tapered fiber end of the plurality of tapered fiber ends.

6. The photonic antenna array according to claim 5, wherein a respective positioner of the plurality of positioners comprises a tilt transducer configured to tilt the respective tapered fiber end corresponding to the respective positioner.

7. The photonic antenna array according to claim 5, wherein a respective positioner of the plurality of positioners comprises a piston transducer configured to provide a piston motion along a direction of propagation of the respective fiber corresponding to the respective positioner.

8. The photonic antenna array according to claim 1, wherein the plurality of tapered fiber ends are arranged in a two-dimensional array.

9. The photonic antenna array according to claim 1, wherein the photonic antenna array is configured to provide phased array-based beam steering based on the plurality of tapered fiber ends outputting beams that have relative phase offsets.

10. The photonic antenna array according to claim 1, wherein the second diameter is less than 5 μm.

11. The photonic antenna array according to claim 10, wherein the second diameter is less than 1 μm.

12. The photonic antenna array according to claim 1, further comprising:
    an index material, wherein the index material encapsulates the plurality of tapered fiber ends.

13. The photonic antenna array according to claim 12, wherein the index material has an index of refraction (n) greater than 1.

* * * * *